United States Patent

[11] 3,624,588

[72] Inventor Edward B. Farmer
Waban, Mass.
[21] Appl. No. 14,338
[22] Filed Feb. 26, 1970
[45] Patented Nov. 30, 1971
[73] Assignee Farmer Elecric Products Co., Inc.
Natick, Mass.

[54] SCREW TERMINAL AND CONDUCTIVE DEVICES INCORPORATING SUCH TERMINALS
9 Claims, 7 Drawing Figs.

[52] U.S. Cl. .......... 339/17 C, 339/220 R, 339/246, 339/275 B
[51] Int. Cl. .......... H05k 1/02
[50] Field of Search .......... 339/17, 149, 14, 217–220, 241, 246, 269, 275

[56] References Cited

UNITED STATES PATENTS

| | | | |
|---|---|---|---|
| 1,639,161 | 8/1927 | Bohlman | 339/32 R |

FOREIGN PATENTS

| | | | |
|---|---|---|---|
| 1,123,304 | 8/1968 | Great Britain | 339/17 D |
| 1,122,649 | 5/1965 | France | 339/220 |
| 604,251 | 3/1958 | Italy | 339/220 |

*Primary Examiner*—Stephen J. Novosad
*Assistant Examiner*—Terrell P. Lewis
*Attorney*—Roberts, Cushman & Grover

ABSTRACT: The terminal herein described is stamped from a single blank with a rectangular plate which is tapped for a terminal screw, which has two ears bent over on opposite sides of the head of a screw inserted in the tapped plate for holding a wire, and which has on opposite sides of the plate, between the two ears, two supporting legs bent over oppositely to the ears. The legs are somewhat higher than the fully inserted screws, and each leg has a solid rectangular tab extending between two coplanar ledges on either side of the tab. The tabs are inserted in round holes of a supporting panel with printed circuitry to project at the circuitry side, and the tabs are then bent over to hold the terminal with the ledges pressed against the panel. The tabs of the connector which rest against parts of the printed circuit opposite the ledges, are then wave soldered to the circuit, whereby the legs which distance the screw from the panel, and the tabs, prevent solder from reaching the threads of the screw in the plate.
Further described is a plurality of the said terminals in combination with a panel which supports a connector for edge contacts of a printed circuit board and has printed circuitry contacting the terminals and edge contacts of the board.

Inventor
Edward B. Farmer
by Roberts, Cushman & Grover,
Att'ys.

SCREW TERMINAL AND CONDUCTIVE DEVICES INCORPORATING SUCH TERMINALS

BACKGROUND OF THE INVENTION

1. Field of the Invention

The invention relates to electrical connectors with contacts on opposite sides of insulation, particularly on preformed panel circuit arrangements, for example printed circuits (Class 339–17, 214, 220).

2. Description cf the Prior Art

The prior art contains various terminal constructions with contact components that can be fastened to panels by means of turned over or riveted projections, such as in U.S. Pat. Nos. 1,177,346 to J. E. Mateer, 2,765,384 to M. .B. Arisman, 2,812,400 to W. H. Budd, 2,972,729 to H. E. Ruehlemann, 3,058,037 to G. A. Naab et al., 3,325,774 to J. R. Tucker, Jr., 3,384,853 to R. J. Rademacher, and French Pat. No. 1,122,649.

These prior art constructions neglect or are not concerned with the necessity of preventing solder of printed circuitry connections from contaminating terminals on the printed circuitry or filling threads of terminal screws, and they also do not concern themselves with the ease of applying connectors which conform to the above requirements, to printed circuit panels, nor with constructions which include circuit panels, edge connected circuit boards, and screw terminals.

SUMMARY OF THE INVENTION

The terminal according to the invention is characterized by a central plate having a threaded hole for a contact screw, by two ears bent over on opposite sides of the plate to reach beyond the head of a contact screw inserted in the threaded hole, and by two supporting legs on opposite sides of the plate intermediate the ears and bent over away from the ears, each leg having at its end a solid tab with a ledge on either side thereof. The tabs are capable of being bent over towards each other to secure the terminal on a panel, with the tabs contacting conductor means such as a printed circuit structure on one side of the panel opposite the ledges which rest on the other side of the panel. Typically, the legs are of sufficient height to prevent contamination of the thread of the terminal screw with solder applied to the opposite or printed circuitry side of the pa..el.

In a further aspect the invention contemplates the combination of a supporting panel with a terminal as characterized above, with two legs having ledges resting on one side of the panel and having tabs extending through the panel and bent over to contact a printed circuitry structure on the other side of the panel, solder being applied to that side. The legs are of sufficient height and the tabs are applied to prevent solder contamination of the terminal screws.

In still another aspect, the invention contemplates the combination of a plurality of terminals as characterized above, with a perforated supporting panel plate having on one side thereof printed circuitry correspondingly perforated, the tabs of the plurality of terminals contacting the circuitry through the perforations, and with contact complete means such as solder on the printed circuitry and tab side of the panel.

Objects of the invention which, among others result from the above outlined characteristic features are to provide terminals especially suited for connecting printed circuitry with factory control installations by way of a supporting panel carrying such terminals as well as a printed circuit board edge connector connected thereto. Terminals according to the invention prevent solder used in connecting them to the panel form contaminating terminal screws by simple and fully reliable expedients. These terminals individually, and panel combinations incorporating them are inexpensive in manufacture and assembly and adaptable to diverse uses.

DESCRIPTION OF A PREFERRED EMBODIMENT

Figure 1:
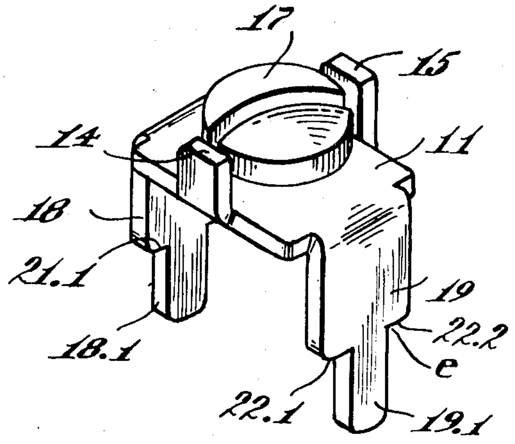
FIG. 1 is an isometric view of a terminal according to the invention, before insertion into a support panel and with a contact screw inserted therein.
Figure 2:
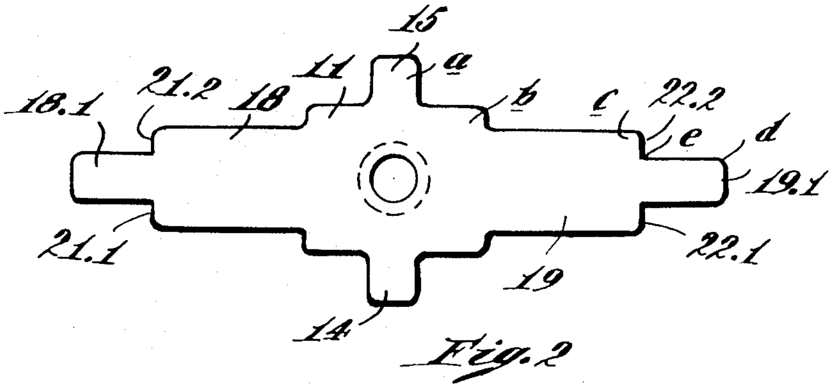
FIG. 2 is a view of a sheet metal stamped and tapped prior to shaping into the configuration of FIG. 1.
Figure 3:
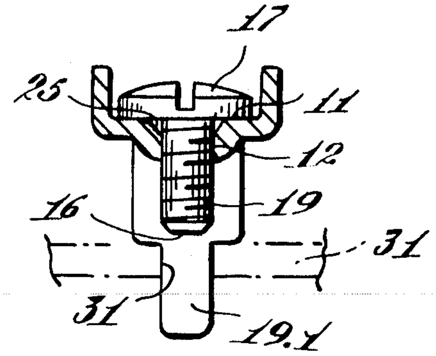
FIG. 3 is a section through the screw center line of the terminal according to FIG. 2.

Referring to FIGS. 1, 2 and 3, a preferably rectangular central plate 11 has a tapped hole 12 and two ears 14, 15 bent from opposite sides of the plate and reaching beyond the terminal screw 16 with head 17, inserted in the tapped hole 12. On the two other opposite sides of the plate 11, between the ears 14 and 15, are two legs 18, 19 bent in opposite direction from the ears and each having a tab 18.1, 19.1 respectively, between two supporting ledges for each leg. These ledges are indicated at 21.1, 21.2 and 22.1 and 22.2. The terminal is fabricated from a blank according to FIG. 2, in the form shown in FIGS. 1 and 3 with the tabs in the same plane as the legs, ready for insertion into perforations of a support panel. As indicated in FIG. 2, the terminal has round corners at *a*, *b*, *c*, *d*, whereas the inside ledge corners *e* at the tabs are sharp in order to assure good contact on the panel. As indicated in FIG. 3, the tapped hole 12 is in a dished portion of the platform as shown at 25, in order to accommodate the nonthreaded shank region of the screw at its head.

Figure 4:
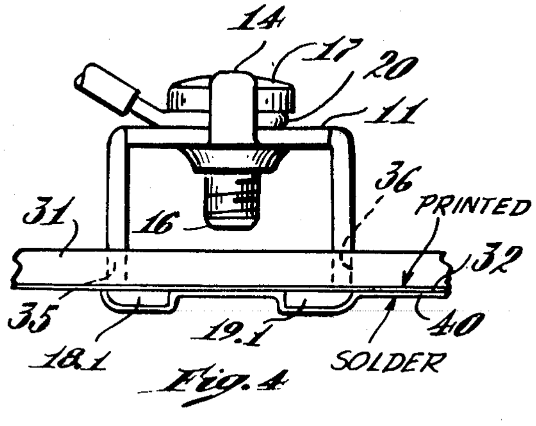
FIG. 4 is a side elevation of a terminal according to FIG. 1, with screw, and fastened to a support panel.
Figure 5:
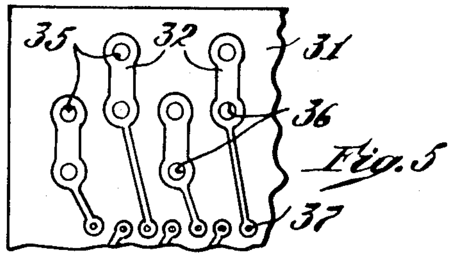
FIG. 5 is the bottom view of a drilled support panel as used in FIG. 4.

For assembly, the tabs 18.1 and 19.1 are inserted into the perforations 35, 36 of a support panel 31 as indicated in FIGS. 3 to 5, made from conventional material such as fiber glass sheet one-sixteenth inch thick. The tabs are then forcefully bent over and inwardly as shown in FIG. 4 to make contact with a printed circuit 32 or other conductor means applied to the panel 31.

FIG. 5 indicates by way of example a conventional printed circuit configuration 32 on panel 31 with round holes corresponding to holes 35, 36 of the panel. Holes for the edge connector receptacles to be described below are indicated at 37.

Upon the tabs 18.1 and 19.1 having been bent inwardly to contact the printed circuit 32, solder is applied to the fiber glass panel in conventional fashion, such as wave soldered, the solder being indicated at 40.

The terminal screws 16 which are at this stage inserted in plates 11, are so dimensioned that the tips of fully tightened screws are above their plates, as indicated in FIG. 3, so that they cannot be reached, and clogged by solder flowing out through passages between the walls of the round holes of the panel and the rectilinear tabs of the connectors. Such contamination with solder often interferes with subsequent loosening of the screws for the purpose of applying the terminal wires indicated at 20 of FIG. 4. Thus, the expedient of raising the platform 11 by making the legs 18, 19 appreciably higher than the fully inserted screw shanks provides, in a simple and inexpensive manner, a feature which is of considerable value in devices of this type. A distance of about one thirty-second inch between plate and screw tip was found to be sufficient. The inward bend of the tabs 18.1, 19.1 assists in keeping solder from the screw tips, closing to some degree those passages which lead directly to the plate region between the legs and containing the screw tip.

Figure 6:
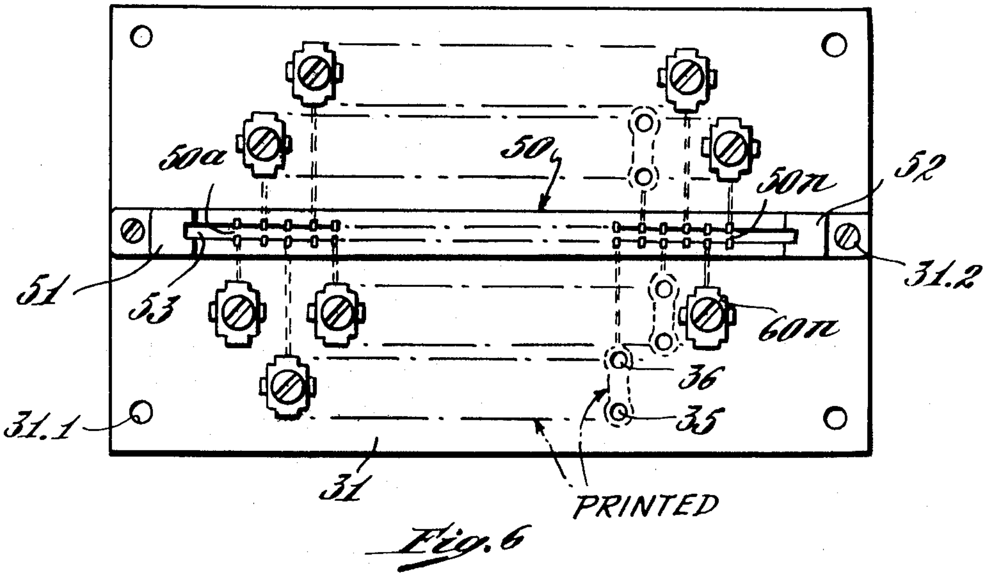
FIG. 6 is the top elevation of a support panel with edge connector and vertical legs for a circuit board.
Figure 7:
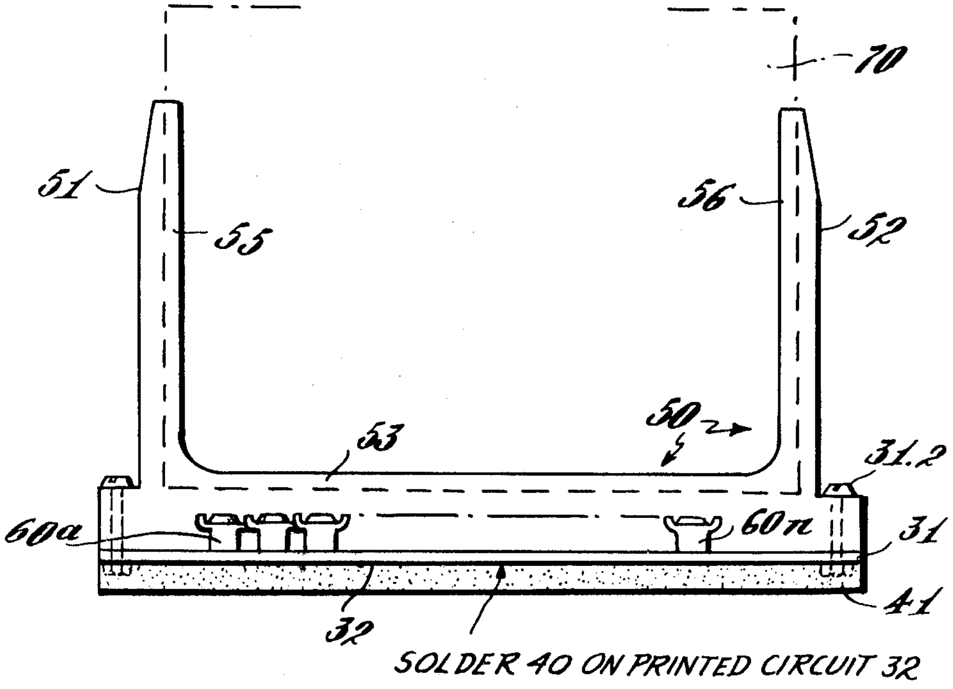
FIG. 7 is a side elevation corresponding to FIG. 6.

Connectors according to the invention are particularly advantageous for use with panels that are intended for supporting an edge of a printed circuit board by means of a conventional edge connector, such as shown in FIGS. 6 and 7. In these FIGS, 31 is the above-described panel 31 with printed circuit 32. The panel 31 can be suitably mounted such as by means of holes 31.1, and insulated such as with a ¼ inch vinyl foam base indicated at 41. Suitably fastened to the panel 31 as with screws 31.2, is a U-shaped so-called edge connector 50 of conventional construction with an interface contact channel 53 and two vertical legs 51, 52. The channel 53 contains conventional contact means such as fork-shaped receptacles indicated at 50*a* to 50 *n* (FIG. 6) which are suitably, such as with solder, fastened to the above-mentioned holes 37 of the panel (FIG. 5), making contact with the printed circuit 32 and the respective connectors, as indicated at 60*a* to 60*n*. FIGS. 6 and 7 also indicate grooves 55, 56 in legs 51, 52 for supporting the vertical edges of a printed circuit board 70 whose connecting edge reaches into channel 53 making contact with the respective receptacles 50*a* to 50*n* on connectors 60*a* to 60*n*, by way of the printed circuit 32 on panel 31.

It will be evident that the above described edge connector construction bridges the gap between printed circuit structures such as board 70 with a considerable member of edge pin connections, and a factory control panel installations such as represented by panel 31 with its screw terminals 60*a* to 60*n* and receptacles 50*a* to 50*n* for the edge pins of 70. This construction confines soldering to the panel and eliminates the requisite operations from the edge connected printed circuit board proper on which they are often cumbersome especially on single unit or small volume installations.

It should be understood that the present disclosure is for the purpose of illustration only and that this invention includes all modifications and equivalents which fall within the scope of the appended claims.

I claim:

1. A terminal soldered to a conductor means on a supporting panel, said terminal comprising, within the contour of a single piece capable of being cut from a sheet metal blank;

a plate having a tapped perforation, two supporting legs bent over in the same direction on opposite sides of the plates and each having a tab narrower than the width of its legs to define ledges on the outer edges of the legs on either side of the respective tabs, the legs being higher than the length of the shank of a screw fully inserted in said tapped perforation;

the conductor means on said supporting panel having perforations therein, said tabs being bent to press the terminal to the panel against said ledges on one side of the panel and to contact the means on the other side;

and with solder applied to the conductor means to connect it to the tabs;

the height of the legs being selected to prevent solder from reaching the thread of a screw in said tapped perforation.

2. Terminal according to claim 1, wherein said tabs are solid and bent from said legs inwardly towards each other.

3. Terminal according to claim 1 further comprising screw confining ears bent from said plate between said legs, in directions opposite to those of the legs.

4. Terminal according to claim 3 wherein said legs and said ears are rectangular and rectangularly bent from said plate.

5. Terminal according to claim 1 wherein said tabs are solid, and fully contact the supporting panel upon being bent from the respective leg to confine the panel between ledges and tabs.

6. Terminal according to claim 1, further comprising a screw in said tapped perforation with its head between said ears, the shank of the screw being appreciably shorter than said legs, for distancing the tip of the shank from said plate to avoid contamination by solder applied to the tabs.

7. The combination of a plurality of terminals according to claim 1 with a supporting panel having perforations in pairs at the distance of said legs of individual terminals, having a plurality of edge connector holes, and having on one side conductor means with opening corresponding to said perforations and holes, the legs of each terminal being inserted into one of said pairs of perforations with corresponding openings with the tabs bent over said conductor means and said ledges resting on the other side of the panel; and means for supporting the connector edge of a printed circuit board mounted on said other side of the panel and including means for connecting edge connector means of the board through said holes of the panel to the printed circuit means of the board.

8. The combination according to claim 7 wherein said conductor means of the panel is a printed circuit containing said perforations and holes.

9. The combination according to claim 8 wherein said tabs of the terminal are soldered to said printed circuit of said panel at said perforations.

* * * * *